(12) United States Patent
Rached

(10) Patent No.: US 9,683,156 B2
(45) Date of Patent: Jun. 20, 2017

(54) HEAT TRANSFER FLUIDS COMPRISING DIFLUOROMETHANE, PENTAFLUOROETHANE, TETRAFLUOROPROPENE AND OPTIONALLY PROPANE

(71) Applicant: ARKEMA FRANCE, Colombes (FR)

(72) Inventor: Wissam Rached, Chaponost (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 15/021,463

(22) PCT Filed: Sep. 2, 2014

(86) PCT No.: PCT/FR2014/052159
§ 371 (c)(1),
(2) Date: Mar. 11, 2016

(87) PCT Pub. No.: WO2015/036677
PCT Pub. Date: Mar. 19, 2015

(65) Prior Publication Data
US 2016/0222272 A1 Aug. 4, 2016

(30) Foreign Application Priority Data

Sep. 11, 2013 (FR) ..................... 13 58735

(51) Int. Cl.
| | | |
|---|---|---|
| C09K 5/04 | (2006.01) | |
| F25B 1/00 | (2006.01) | |
| F25B 13/00 | (2006.01) | |
| F25B 30/02 | (2006.01) | |
| F25B 45/00 | (2006.01) | |

(52) U.S. Cl.
CPC ............... *C09K 5/045* (2013.01); *F25B 1/00* (2013.01); *F25B 13/00* (2013.01); *F25B 30/02* (2013.01); *F25B 45/00* (2013.01); *C09K 2205/12* (2013.01); *C09K 2205/122* (2013.01); *C09K 2205/126* (2013.01); *C09K 2205/22* (2013.01); *C09K 2205/40* (2013.01)

(58) Field of Classification Search
CPC .... C09K 5/04; C09K 5/045; C09K 2205/122; C09K 2205/126; C09K 5/08; C09K 2205/12; C10M 171/008; C10N 2040/30; F25B 1/00; F25B 13/00
USPC ................ 252/67, 68, 69; 62/467, 502, 529
See application file for complete search history.

(56) References Cited

U.S. PATENT DOCUMENTS

| | | | |
|---|---|---|---|
| 2,438,120 A | 3/1948 | Freygang | |
| 2,834,748 A | 5/1958 | Bailey et al. | |
| 2,846,458 A | 8/1958 | Haluska et al. | |
| 2,917,480 A | 12/1959 | Bailey et al. | |
| 5,399,631 A | 3/1995 | Egawa et al. | |
| 5,497,631 A | 3/1996 | Lorentzen et al. | |
| 5,643,492 A | 7/1997 | Shiflett | |
| 5,688,432 A | 11/1997 | Pearson | |
| 5,722,256 A | 3/1998 | Shiflett | |
| 5,744,052 A | 4/1998 | Bivens | |
| 6,454,960 B1 | 9/2002 | Sunaga et al. | |
| 6,508,950 B1 | 1/2003 | Lim et al. | |
| 6,589,355 B1 | 7/2003 | Thomas et al. | |
| 6,655,160 B2 | 12/2003 | Roberts | |
| 7,914,696 B2 | 3/2011 | Low et al. | |
| 8,070,977 B2 | 12/2011 | Rached | |
| 8,075,798 B2 | 12/2011 | Rached | |
| 8,142,680 B2 | 3/2012 | Rached | |
| 8,246,850 B2 | 8/2012 | Rached | |
| 8,443,624 B2 | 5/2013 | Yamashita et al. | |
| 8,496,845 B2 | 7/2013 | Tsuchiya et al. | |
| 9,057,010 B2 | 6/2015 | Rached | |
| 9,359,540 B2 | 6/2016 | Rached | |
| 9,488,398 B2 | 11/2016 | Rached | |
| 2006/0025322 A1 | 2/2006 | Wilson et al. | |
| 2006/0243944 A1 | 11/2006 | Minor et al. | |
| 2006/0243945 A1 | 11/2006 | Minor et al. | |
| 2006/0269484 A1 | 11/2006 | Knopeck et al. | |
| 2007/0108403 A1 | 5/2007 | Sievert et al. | |
| 2008/0230738 A1 | 9/2008 | Minor et al. | |
| 2009/0158771 A1 | 6/2009 | Low et al. | |
| 2009/0249864 A1 | 10/2009 | Minor et al. | |
| 2009/0250650 A1 | 10/2009 | Minor et al. | |

(Continued)

FOREIGN PATENT DOCUMENTS

| | | |
|---|---|---|
| EP | 0 509 673 A1 | 10/1992 |
| EP | 0 811 670 A1 | 12/1997 |

(Continued)

OTHER PUBLICATIONS

International Search Report (PCT/ISA/210) issued on Feb. 18, 2015, by the Japanese Patent Office as the International Searching Authority for International Application No. PCT/FR2014/052159.
Written Opinion (PCT/ISA/237) issued on Feb. 18, 2015, by the Japanese Patent Office as the International Searching Authority for International Application No. PCT/FR2014/052159.
U.S. Appl. No. 15/150,889, Rached.
Third Party Observation mailed May 26, 2014 by the European Patent Office in EP Appln No. 11731420.3 (4 pages).
Takizawa, K., et al., "Flammability Assessment of $CH_2=CFCF_3$: Comparison with Fluoroalkenes and Fluoroalkanes", Journal of Hazardous Materials, vol. 172, No. 2-3, Aug. 18, 2009, pp. 1329-1338, XP026719989, Elsevier B.V.

(Continued)

*Primary Examiner* — Douglas Mc Ginty
(74) *Attorney, Agent, or Firm* — Buchanan Ingersoll & Rooney P.C.

(57) ABSTRACT

A composition includes between 11 and 13 wt. % of difluoromethane; between 58 and 62 wt. % of pentafluoroethane; between 18 and 29 wt. % of tetrafluoropropene; and between 0 and 7 wt. % of propane. The tetrafluoropropene can be 1,3,3,3-tetrafluoropropene or 2,3,3,3-tetrafluoropropene. The composition can be used as a heat transfer fluid in a vapor compression circuit.

23 Claims, No Drawings

(56) References Cited

U.S. PATENT DOCUMENTS

| | | |
|---|---|---|
| 2009/0278072 A1 | 11/2009 | Minor |
| 2009/0305876 A1 | 12/2009 | Singh et al. |
| 2010/0044619 A1 | 2/2010 | Hulse et al. |
| 2010/0044620 A1 | 2/2010 | Rached |
| 2010/0122545 A1 | 5/2010 | Minor et al. |
| 2011/0079042 A1 | 4/2011 | Yamashita et al. |
| 2011/0095224 A1 | 4/2011 | Rached |
| 2011/0108756 A1 | 5/2011 | Tsuchiya et al. |
| 2011/0162410 A1 | 7/2011 | Low |
| 2011/0173997 A1 | 7/2011 | Low et al. |
| 2011/0186772 A1* | 8/2011 | Rached ............... C08J 9/146 252/67 |
| 2011/0219792 A1 | 9/2011 | Rached |
| 2011/0219815 A1 | 9/2011 | Yana Motta et al. |
| 2011/0240254 A1 | 10/2011 | Rached |
| 2011/0284181 A1 | 11/2011 | Rached |
| 2012/0049104 A1 | 3/2012 | Rached |
| 2012/0056123 A1 | 3/2012 | Rached |
| 2012/0097885 A9 | 4/2012 | Hulse et al. |
| 2012/0144857 A1 | 6/2012 | Rached |
| 2012/0151959 A1 | 6/2012 | Rached |
| 2012/0153213 A1 | 6/2012 | Rached |
| 2012/0159982 A1 | 6/2012 | Rached |
| 2012/0161064 A1 | 6/2012 | Rached |
| 2012/0167615 A1 | 7/2012 | Rached |
| 2012/0255316 A1 | 10/2012 | Andre et al. |
| 2012/0312048 A1 | 12/2012 | Poole et al. |
| 2013/0055733 A1 | 3/2013 | Rached |
| 2013/0055738 A1 | 3/2013 | Rached |
| 2013/0055739 A1 | 3/2013 | Rached |
| 2013/0061613 A1 | 3/2013 | Rached |
| 2013/0096218 A1* | 4/2013 | Rached ............... C09K 5/045 521/170 |
| 2013/0145778 A1 | 6/2013 | Yana Motta et al. |
| 2013/0193369 A1 | 8/2013 | Low |
| 2013/0255284 A1 | 10/2013 | Rached |
| 2014/0075969 A1 | 3/2014 | Guerin et al. |
| 2014/0137578 A1 | 5/2014 | Yana Motta et al. |
| 2014/0223927 A1 | 8/2014 | Pottker et al. |
| 2015/0135765 A1 | 5/2015 | Yana Motta et al. |
| 2015/0184052 A1 | 7/2015 | Rached |
| 2015/0291869 A1 | 10/2015 | Boussand |
| 2016/0252283 A1 | 9/2016 | Rached |

FOREIGN PATENT DOCUMENTS

| | | |
|---|---|---|
| EP | 2 767 569 A1 | 8/2014 |
| KR | 2001-0044992 A | 6/2001 |
| WO | WO 2004/037913 A2 | 5/2004 |
| WO | WO 2004/037913 A3 | 5/2004 |
| WO | WO 2005/105947 A2 | 11/2005 |
| WO | WO 2005/105947 A3 | 11/2005 |
| WO | WO 2007/002625 A2 | 1/2007 |
| WO | WO 2007/053697 A2 | 5/2007 |
| WO | WO 2007/053697 A3 | 5/2007 |
| WO | WO 2007/126414 A2 | 11/2007 |
| WO | WO 2007/126414 A3 | 11/2007 |
| WO | WO 2009/047542 A1 | 4/2009 |
| WO | WO 2009/151669 A1 | 12/2009 |
| WO | WO 2009/154149 A1 | 12/2009 |
| WO | WO 2010/002014 A1 | 1/2010 |
| WO | WO 2010/059677 A2 | 5/2010 |
| WO | WO 2010/059677 A3 | 5/2010 |
| WO | WO 2010/064005 A1 | 6/2010 |
| WO | WO 2010/129461 A2 | 11/2010 |
| WO | WO 2010/129461 A3 | 11/2010 |
| WO | WO 2010/129920 A1 | 11/2010 |
| WO | WO 2011/073934 A1 | 6/2011 |
| WO | WO 2011/077088 A1 | 6/2011 |
| WO | WO 2011/107698 A2 | 9/2011 |
| WO | WO 2011/107698 A3 | 9/2011 |
| WO | WO 2011/141654 A2 | 11/2011 |
| WO | WO 2011/141654 A3 | 11/2011 |
| WO | WO 2011/141656 A2 | 11/2011 |
| WO | WO 2011/141656 A3 | 11/2011 |
| WO | WO 2012/069725 A1 | 5/2012 |
| WO | WO 2012/150391 A1 | 11/2012 |
| WO | WO 2014/081539 A1 | 5/2014 |

OTHER PUBLICATIONS

Takizawa, K., et al., "Flammability Assessment of $CH_2=CFCF_3$ (R-1234yf) and its Mixtures with $CH_2F_2$ (R-32); 2010 International Symposium on Next-generation Air Conditioning and Refrigeration Technology," Tokyo, JP, Feb. 17-19, 2010, pp. 1-8.

"Definitions: Humidity," Healthy Heating, May 18, 2008, 4 pages, XP002594956, http://web.archive.org/web/20080518174151/http://www.healthyheating.com/Thermal_Comfort_Working_Copy/Definitions/humidity.htm.

Translated Excerpt from official Action issued Mar. 3, 2015 in corresponding Japanese Patent Application No. 2013-0509593, Japan Patent Office, 1 page.

Rached, Wissam, U.S. Appl. No. 15/150,889, entitled "Ternary Heat-Transfer Fluids Comprising Difluoromethane, Pentafluoroethane and Tetrafluoropropene," filed in the U.S. Patent and Trademark Office on May 10, 2016.

Donnelly, M. K, et al., "The Flammability of R-245ca", ASHRAE Transactions: Symposia (American Society of Heating, Refrigerating and Air-Conditioning Engineers), 1999, 10 pages, including pp. 1160-1176, ASHRAE, USA.

Van Den Schoor, Filip, University Thesis, "Influence of Pressure and Temperature on Flammability Limits of Combustible Gases in Air," May 2007, 228 pages, Katholieke Universiteit Leuven— Faculteit Ingenieurswetenschappen, Leuven. BE, ISBN 978-90-5682-813-4.

* cited by examiner

HEAT TRANSFER FLUIDS COMPRISING DIFLUOROMETHANE, PENTAFLUOROETHANE, TETRAFLUOROPROPENE AND OPTIONALLY PROPANE

FIELD OF THE INVENTION

The present invention relates to transfer fluids based on difluoromethane, pentafluoroethane, tetrafluoropropene and optionally propane, which have high performances and a low GWP, and are therefore suitable for the replacement of standard refrigerants without a major modification of the equipment.

TECHNICAL BACKGROUND

Fluids based on fluorocarbon compounds are widely used in vapor compression heat transfer systems, in particular air conditioning, heat pump, refrigeration or freezing devices. These devices have in common the fact that they are based on a thermodynamic cycle comprising the vaporization of the fluid at low pressure (in which the fluid absorbs heat); the compression of the vaporized fluid up to a high pressure; the condensation of the vaporized fluid to liquid at high pressure (in which the fluid releases heat); and the expansion of the fluid in order to complete the cycle.

The choice of a heat transfer fluid (which may be a pure compound or mixture of compounds) is dictated, on the one hand, by the thermodynamic properties of the fluid and, on the other hand, by additional constraints. Thus, one particularly important criterion is that of the impact of the fluid considered on the environment. In particular, chlorinated compounds (chlorofluorocarbons and hydrochlorofluorocarbons) have the disadvantage of damaging the ozone layer. Henceforth, generally non-chlorinated compounds such as hydrofluorocarbons, fluoroethers and fluoroolefins are therefore preferred to them.

The heat transfer fluid currently used in low-temperature refrigeration and/or moderate-temperature cooling processes is R404a (ternary mixture of 52% of HFC-143a, 44% of HFC-125 and 4% of HFC-134a).

However, the compositions proposed to date for replacing R404a, having a GWP of 2100, without a major modification of the operating conditions and/or equipment, are not satisfactory. These compositions have at least one of the following drawbacks: flammable, not very efficient, a temperature glide at the evaporator of at least 3° C. and/or a compressor outlet temperature that is 6° C. higher. In addition, they cannot be used in equipment provided with compressors operating with R404A, with the exception of compressors equipped with liquid injection technology. This technology is however expensive and furthermore is unsuitable for piston technology.

Document US 2009/0250650 describes various compositions based on fluoroolefins and the use thereof as heat transfer fluids. In particular, the document describes the mixture consisting of HFC-32, HFC-125 and HFO-1234ze and also the mixture consisting of HFC-32, HFC-125 and HFO-1234yf. The compositions indicated as being preferred are the following:
  23% of HFC-32, 25% of HFC-125 and 52% of HFO-1234ze;
  30% of HFC-32, 50% of HFC-125 and 20% of HFO-1234ze;
  40% of HFC-32, 50% of HFC-125 and 10% of HFO-1234yf;
  23% of HFC-32, 25% of HFC-125 and 52% of HFO-1234yf;
  15% of HFC-32, 45% of HFC-125 and 40% of HFO-1234yf; and
  10% of HFC-32, 60% of HFC-125 and 30% of HFO-1234yf.

Document WO 2010/002014 describes a nonflammable refrigerant based on HFC-32, HFC-125 and HFO-1234yf. Several compositions are disclosed and in particular that comprising 15% of HFC-32, 25% of HFC-125 and 60% of HFO-1234yf.

It is however necessary to develop other heat transfer fluids having a global warming potential (GWP) lower than that of R404a, and having an equivalent, and preferably improved performance without the aforementioned drawbacks.

SUMMARY OF THE INVENTION

The invention relates firstly to a composition comprising:
  from 11 to 13% of difluoromethane;
  from 58 to 62% of pentafluoroethane;
  from 18 to 29% of tetrafluoropropene; and
  from 0 to 7% of propane.

According to one embodiment, the tetrafluoropropene is 1,3,3,3-tetrafluoropropene.

According to one preferred embodiment, the tetrafluoropropene is 2,3,3,3-tetrafluoropropene.

The composition according to the invention preferably comprises:
  from 11 to 13% of difluoromethane;
  from 59 to 61% of pentafluoroethane;
  from 25 to 28% of 2,3,3,3-tetrafluoropropene or 1,3,3,3-tetrafluoropropene; and
  from 0 to 3% of propane, preferably from 0 to 2% of propane.

The invention also relates to the use of the aforementioned composition, as heat transfer fluid in a vapor compression circuit.

The invention also relates to a heat transfer composition comprising the abovementioned composition as heat transfer fluid, and one or more additives selected from lubricants, stabilizers, surfactants, tracers, fluorescent agents, odorous agents, solubilizing agents and mixtures thereof.

The invention also relates to a heat transfer system comprising a vapor compression circuit containing the abovementioned composition as heat transfer fluid, or containing an abovementioned heat transfer composition.

According to one embodiment, this system is selected from mobile or stationary systems for refrigeration, for heating (heat pump), for air conditioning and for freezing.

The invention also relates to a process for heating or cooling a fluid or a body by means of a vapor compression circuit containing a heat transfer fluid, said process successively comprising the evaporation of the heat transfer fluid, the compression of the heat transfer fluid, the condensation of the heat fluid and the expansion of the heat transfer fluid, and the heat transfer fluid being the abovementioned composition.

According to one embodiment of the heating or cooling process, this process is a process for cooling a fluid or a body, wherein the temperature of the fluid or of the body cooled is from −40° C. to −10° C., and preferably from −35° C. to −25° C., more particularly preferably from −30° C. to −20° C., and wherein the heat transfer fluid comprises:
  from 11 to 13% of difluoromethane, from 58 to 62% of pentafluoroethane, from 18 to 29% of 2,3,3,3-tetrafluoropropene and from 0 to 7% of propane, preferably from 11 to 13% of difluoromethane, from 59 to 61% of pentafluoroethane, from 25 to 28% of 2,3,3,3-tetrafluoropropene and from 0 to 3% of propane, preferably from 0 to 2% of propane; or from 11 to 13% of difluoromethane, from 58 to 62% of pentafluoroethane, from 18 to 29% of 1,3,3,3-tetrafluoropropene and from 0 to 7% of propane, preferably from 11 to 13% of difluoromethane, from 59 to 61% of pentafluoroethane, from 25 to 28% of 1,3,3,3-tetrafluoropropene and from 0 to 3% of propane, preferably from 0 to 2% of propane.

According to another embodiment of the heating or cooling process, this process is a process for cooling a fluid or a body, wherein the temperature of the fluid or of the body cooled is from −15° C. to 15° C., and preferably from −10° C. to 10° C., more particularly preferably from −5° C. to 5° C., and wherein the heat transfer fluid comprises:

from 11 to 13% of difluoromethane, from 58 to 62% of pentafluoroethane, from 18 to 29% of 2,3,3,3-tetrafluoropropene and from 0 to 7% of propane, preferably from 11 to 13% of difluoromethane, from 59 to 61% of pentafluoroethane, from 25 to 28% of 2,3,3,3-tetrafluoropropene and from 0 to 3% of propane, preferably from 0 to 2% of propane; or from 11 to 13% of difluoromethane, from 58 to 62% of pentafluoroethane, from 18 to 29% of 1,3,3,3-tetrafluoropropene and from 0 to 7% of propane, preferably from 11 to 13% of difluoromethane, from 59 to 61% of pentafluoroethane, from 25 to 28% of 1,3,3,3-tetrafluoropropene and from 0 to 3% of propane, preferably from 0 to 2% of propane.

According to another embodiment of the heating or cooling process, this process is a process for heating a fluid or a body, wherein the temperature of the fluid or of the body heated is from 30° C. to 80° C., and preferably from 35° C. to 55° C., more particularly preferably from 40° C. to 50° C., and wherein the heat transfer fluid comprises:

from 11 to 13% of difluoromethane, from 58 to 62% of pentafluoroethane, from 18 to 29% of 2,3,3,3-tetrafluoropropene and from 0 to 7% of propane, preferably from 11 to 13% of difluoromethane, from 59 to 61% of pentafluoroethane, from 25 to 28% of 2,3,3,3-tetrafluoropropene and from 0 to 3% of propane, preferably from 0 to 2% of propane; or from 11 to 13% of difluoromethane, from 58 to 62% of pentafluoroethane, from 18 to 29% of 1,3,3,3-tetrafluoropropene and from 0 to 7% of propane, preferably from 11 to 13% of difluoromethane, from 59 to 61% of pentafluoroethane, from 25 to 28% of 1,3,3,3-tetrafluoropropene and from 0 to 3% of propane, preferably from 0 to 2% of propane.

The invention also relates to a process for reducing the environmental impact of a heat transfer system comprising a vapor compression circuit containing an initial heat transfer fluid (R404a), said process comprising a step of replacing the initial heat transfer fluid in the vapor compression circuit with a final transfer fluid, the final transfer fluid having a GWP lower than the initial heat transfer fluid, wherein the final heat transfer fluid is the abovementioned composition.

The present invention makes it possible to overcome the drawbacks of the prior art. More particularly it provides heat transfer fluids that have a relatively low GWP and that have a better energy performance than R404a without major modification of the operating conditions and/or equipment. In addition, these fluids have the advantage of being non-flammable, and/or of having a temperature glide at the evaporator of less than 3° C. and/or a compressor outlet temperature that does not exceed by more than 6° C. the temperature of R404A under the same operating conditions.

This is accomplished owing to mixtures comprising HFC-32, HFC-125, tetrafluoropropene and optionally propane in the proportions indicated above.

According to the invention, the global warming potential (GWP) is defined relative to carbon dioxide and relative to a period of 100 years, according to the method indicated in "The scientific assessment of ozone depletion, 2002, a report of the World Meteorological Association's Global Ozone Research and Monitoring Project".

According to the invention, the flammability is defined according to the standard ISO 817 or ASHRAE 34–2010 and the test method according to ASTM E681 (with a flammability test temperature of 60° C. and a relative humidity at 50%).

DESCRIPTION OF EMBODIMENTS OF THE INVENTION

The invention is now described in greater detail and non-limitingly in the description which follows.

The expressions "heat transfer compound", respectively "heat transfer fluid" (or refrigerant), are understood to mean a compound, respectively a fluid, capable of absorbing heat by evaporating at low temperature and low pressure and of releasing heat by condensing at high temperature and high pressure, in a vapor compression circuit. Generally, a heat transfer fluid may comprise one, two, three or more than three heat transfer compounds.

The expression "heat transfer composition" is understood to mean a composition comprising a heat transfer fluid and optionally one or more additives which are not heat transfer compounds for the envisaged application.

The heat transfer process according to the invention is based on the use of a system comprising a vapor compression circuit which contains a heat transfer fluid. The heat transfer process may be a process for heating or cooling a fluid or a body.

The vapor compression circuit containing a heat transfer fluid comprises at least an evaporator, a compressor, a condenser and an expansion valve, and also lines for transporting heat transfer fluid between these components. The evaporator and the condenser comprise a heat exchanger making it possible to exchange heat between the heat transfer fluid and another fluid or body.

As a compressor, use may especially be made of a centrifugal compressor having one or more stages or a centrifugal mini-compressor. Rotary compressors, reciprocating compressors or screw compressors may also be used. The compressor may be driven by an electric motor or by a gas turbine (for example fed by the exhaust gases of a vehicle, for mobile applications), or by gearing.

The system may comprise a turbine for generating electricity (Rankine cycle).

The system may also optionally comprise at least one coolant circuit used for transmitting heat (with or without a change of state) between the heat transfer fluid circuit and the fluid or body to be heated or cooled.

The system may also optionally comprise two (or more) vapor compression circuits containing identical or different heat transfer fluids. For example, the vapor compression circuits may be coupled together.

The vapor compression circuit operates according to a conventional vapor compression cycle. The cycle comprises the change of state of the heat transfer fluid from a liquid phase (or liquid/vapor two phase state) to a vapor phase at a relatively low pressure, then the compression of the fluid in the vapor phase up to a relatively high pressure, the change of state (condensation) of the heat transfer fluid from the vapor phase to the liquid phase at a relatively high pressure, and the reduction of the pressure in order to recommence the cycle.

In the case of a cooling process, heat from the fluid or from the body that is being cooled (directly or indirectly, via a coolant) is absorbed by the heat transfer fluid, during the evaporation of the latter, at a relatively low temperature compared to the surroundings. Cooling processes include air conditioning processes (with mobile systems, for example in vehicles, or stationary systems), refrigeration and freezing processes or cryogenic processes.

In the case of a heating process, heat is imparted (directly or indirectly, via a coolant) from the heat transfer fluid, during the condensation thereof, to the fluid or body that is being heated, at a relatively high temperature compared to the surroundings. The system that makes it possible to implement the heat transfer is called, in this case, a "heat pump".

It is possible to use any type of heat exchanger for the implementation of the heat transfer fluids according to the invention, and in particular cocurrent heat exchangers.

However, according to one preferred embodiment, the invention makes provision for the cooling and heating processes, and the corresponding systems, to comprise a countercurrent heat exchanger, which is countercurrent with respect either to the condenser, or to the evaporator. Indeed, the heat transfer fluids according to the invention are particularly effective with countercurrent heat exchangers. Preferably, both the evaporator and the condenser comprise a countercurrent heat exchanger.

According to the invention, the expression "countercurrent heat exchanger" is understood to mean a heat exchanger in which heat is exchanged between a first fluid and a second fluid, the first fluid at the inlet of the exchanger exchanging heat with the second fluid at the outlet of the exchanger, and the first fluid at the outlet of the exchanger exchanging heat with the second fluid at the inlet of the exchanger.

For example, countercurrent heat exchangers include devices in which the flow of the first fluid and the flow of the second fluid are in opposite directions or virtually opposite directions. Exchangers operating in cross-current mode with a countercurrent tendency are also included among the countercurrent heat exchangers within the meaning of the present application.

The meaning of the various abbreviations used for denoting the various chemical compounds mentioned in the application is the following:
HFC-125: pentafluoroethane;
HFC-32: difluoromethane;
HFO-1234ze: 1,3,3,3-tetrafluoropropene;
HFO-1234yf: 2,3,3,3-tetrafluoropropene.

The expression "ternary composition" is understood to mean a composition consisting essentially of the three compounds mentioned (HFC-32/HFC-125/tetrafluoropropene), i.e. in which the three compounds mentioned represent at least 99% (preferably at least 99.5% or even at least 99.9%) of the composition.

The preferred ternary composition consists of 12% (±0.2%) of HFC-32, 28% (±0.2%) of HFO-1234yf and 60% (±0.2%) of HFC-125.

The expression "quaternary composition" is understood to mean a composition consisting essentially of the four compounds mentioned (HFC-32/HFC-125/tetrafluoropropene/propane), i.e. in which the four compounds mentioned represent at least 99% (preferably at least 99.5% or even at least 99.9%) of the composition.

The preferred quaternary composition consists of 12% (±1%) of HFC-32, 24.4% (±1%) of HFO-1234yf, 62% (±1%) of HFC-125 and 0.6% (±0.2%) of HC-290.

Unless otherwise mentioned, throughout the application, the proportions of compounds indicated are given as percentages by weight.

HFO-1234ze may be in cis or trans form (preferably trans form) or be a mixture of these two forms.

For use in low-temperature refrigeration processes, i.e. those in which the temperature of the fluid or of the body cooled is from −40° C. to −10° C., and preferably from −35° C. to −25° C., more particularly preferably from −30° C. to −20° C. (ideally around −25° C.), it has been found that the compositions that are most effective as a replacement for R404a are the following:

from 11 to 13% of difluoromethane, from 58 to 62% of pentafluoroethane, from 18 to 29% of 2,3,3,3-tetrafluoropropene and from 0 to 7% of propane, preferably from 11 to 13% of difluoromethane, from 59 to 61% of pentafluoroethane, from 25 to 28% of 2,3,3,3-tetrafluoropropene and from 0 to 3% of propane, preferably from 0 to 2% of propane; preferably from 11 to 13% of difluoromethane, from 61 to 63% of pentafluoroethane, from 24 to 26% of 2,3,3,3-tetrafluoropropene and from 0.3 to 0.8% of propane, or from 11 to 13% of difluoromethane, from 58 to 62% of pentafluoroethane, from 18 to 29% of 1,3,3,3-tetrafluoropropene and from 0 to 7% of propane, preferably from 11 to 13% of difluoromethane, from 59 to 61% of pentafluoroethane, from 25 to 28% of 1,3,3,3-tetrafluoropropene and from 0 to 3% of propane, preferably from 0 to 2% of propane.

For use in:
moderate-temperature cooling processes, i.e. those in which the temperature of the fluid or of the body cooled is from −15° C. to 15° C., and preferably from −10° C. to 10° C., more particularly preferably from −5° C. to 5° C. (ideally around 0° C.), and also
moderate-temperature heating processes, i.e. those in which the temperature of the fluid or of the body heated is from 30° C. to 80° C., and preferably from 35° C. to 55° C., more particularly preferably from 40° C. to 50° C. (ideally around 45° C.).

In the "low-temperature refrigeration" processes mentioned above, the inlet temperature of the heat transfer fluid at the evaporator is preferably from −45° C. to −15° C., in particular from −40° C. to −20° C., more particularly preferably from −35° C. to −25° C. and for example around −30° C.; and the temperature at the beginning of the condensation of the heat transfer fluid at the condenser is preferably from 25° C. to 80° C., in particular from 30° C. to 60° C., more particularly preferably from 35° C. to 55° C. and for example around 40° C.

In the "moderate-temperature cooling" processes mentioned above, the inlet temperature of the heat transfer fluid at the evaporator is preferably from −20° C. to 10° C., in particular from −15° C. to 5° C., more particularly preferably from −10° C. to 0° C. and for example around −5° C.; and the temperature at the beginning of the condensation of the heat transfer fluid at the condenser is preferably from 25° C. to 80° C., in particular from 30° C. to 60° C., more particularly preferably from 35° C. to 55° C. and for example around 50° C. These processes may be refrigeration or air conditioning processes.

In the "moderate-temperature heating" processes mentioned above, the inlet temperature of the heat transfer fluid at the evaporator is preferably from −20° C. to 10° C., in particular from −15° C. to 5° C., more particularly preferably from −10° C. to 0° C. and for example around −5° C.; and the temperature at the beginning of the condensation of the heat transfer fluid at the condenser is preferably from 25° C. to 80° C., in particular from 30° C. to 60° C., more particularly preferably from 35° C. to 55° C. and for example around 50° C.

The compositions according to the invention are particularly advantageous in refrigerated transport.

Refrigerated transport is considered to be any movement of perishable products inside a refrigerated space. Food or pharmaceutical products represent a large portion of perishable products.

Refrigerated transport may be carried out by truck, railroad or ship, optionally with the aid of intermodal containers that are equally compatible with trucks, railroads or ships.

In refrigerated transport, the temperature of the refrigerated spaces is between −30° C. and 16° C. The refrigerant charge in transport by truck, railroad or intermodal containers varies between 4 kg and 8 kg of refrigerant. The systems in ships may contain between 100 and 500 kg.

The most used refrigerant to date is R404A.

The operating temperatures of the refrigerating systems are a function of the refrigeration temperature requirements and outside climatic conditions. A same refrigerating system must be capable of covering a wide temperature range between −30° C. and 16° C. and operating both in cold and hot climates.

The most restrictive condition in terms of evaporation temperature is −30° C.

The compositions according to the present invention may be used for the replacement of R407c (ternary mixture of 52% of HFC-134a, 25% of HFC-125 and 23% of HFC-32).

The heat transfer fluids mentioned above are not azeotrope-like fluids and are highly effective when they are correctly coupled with a countercurrent heat exchanger (with a temperature difference with the second fluid that is approximately constant in the exchanger).

Each heat transfer fluid above may be mixed with one or more additives in order to provide the heat transfer composition actually circulating in the vapor compression circuit. The additives may in particular be selected from lubricants, stabilizers, surfactants, tracers, fluorescent agents, odorous agents, solubilizing agents and mixtures thereof.

The stabilizer or stabilizers, when they are present, preferably represent at most 5% by weight in the heat transfer composition. Among the stabilizers, mention may especially be made of nitromethane, ascorbic acid, terephthalic acid, azoles such as tolutriazole or benzotriazole, phenolic compounds such as tocopherol, hydroquinone, t-butyl hydroquinone, 2,6-di-tert-butyl-4-methylphenol, epoxides (alkyl, optionally fluorinated or perfluorinated, or alkenyl or aromatic epoxides) such as n-butyl glycidyl ether, hexanediol diglycidyl ether, allyl glycidyl ether, butylphenyl glycidyl ether, phosphites, phosphonates, thiols and lactones.

As lubricants, use may especially be made of oils of mineral origin, silicone oils, paraffins, naphthenes, synthetic paraffins, alkylbenzenes, poly-α-olefins, polyalkylene glycols, polyol esters and/or polyvinyl ethers.

As tracers (capable of being detected), mention may be made of hydrofluorocarbons, deuterated hydrofluorocarbons, deuterated hydrocarbons, perfluorocarbons, fluoroethers, brominated compounds, iodinated compounds, alcohols, aldehydes, ketones, nitrogen protoxide and combinations thereof. The tracer is different from the heat transfer compound(s) making up the heat transfer fluid.

As solubilizing agents, mention may be made of hydrocarbons, dimethyl ether, polyoxyalkylene ethers, amides, ketones, nitriles, chlorocarbons, esters, lactones, aryl ethers, fluoroethers and 1,1,1-trifluoroalkanes. The solubilizing agent is different from the heat transfer compound(s) making up the heat transfer fluid.

As fluorescent agents, mention may be made of naphthalimides, perylenes, coumarins, anthracenes, phenanthracenes, xanthenes, thioxanthenes, naphthoxanthenes, fluoresceins and derivatives and combinations thereof.

As odorous agents, mention may be made of alkyl acrylates, allyl acrylates, acrylic acids, acrylic esters, alkyl ethers, alkyl esters, alkynes, aldehydes, thiols, thioethers, disulfides, allyl isothiocyanates, alkanoic acids, amines, norbornenes, derivatives of norbornenes, cyclohexene, heterocyclic aromatic compounds, ascaridole, o-methoxy (methyl)phenol and combinations thereof.

The compositions according to the invention may also be used as a blowing agent, aerosol or solvent.

EXAMPLES

The following examples illustrate the invention without limiting it.

Example 1

Method of Calculating the Properties of the Heat Transfer Fluids in the Various Configurations Envisaged The RK-Soave equation is used for calculating the densities, enthalpies, entropies and liquid/vapor equilibrium data of the mixtures. The use of this equation requires knowledge of the properties of the pure bodies used in the mixtures in question and also the interaction coefficients for each binary mixture.

The data available for each pure body are the boiling point, the critical temperature and the critical pressure, the curve of pressure as a function of the temperature starting from the boiling point up to the critical point, the saturated liquid and saturated vapor densities as a function of the temperature.

The data on the hydrofluorocarbons are published in the ASHRAE Handbook 2005, chapter 20 and/or are also available from Refrop (software developed by NIST for calculating the properties of refrigerants).

The data of the temperature-pressure curve of the hydrofluoroolefins are measured by the static method. The critical temperature and critical pressure are measured using a C80 calorimeter sold by Setaram.

The RK-Soave equation uses binary interaction coefficients to represent the behavior of the products in mixtures.

The coefficients are calculated as a function of the experimental liquid/vapor equilibrium data.

The technique used for the liquid/vapor equilibrium measurements is the static analytical cell method. The equilibrium cell comprises a sapphire tube and is equipped with two ROLSI™ electromagnetic samplers. It is immersed in a cryothermostat bath (HUBER HS40). Field-driven magnetic stirring rotating at a variable speed is used to accelerate the achievement of equilibria. The samples are analyzed by gas chromatography (HP5890 Series II) using a katharometer (TCD).

The liquid/vapor equilibrium measurements on the HFC-32/HFO-1234yf binary mixture are carried out for the following isotherms: 70° C., 30° C., −10° C.

The liquid/vapor equilibrium data for the HFC-125/HFC-32 binary mixture are available from Refprop. Three isotherms (−30° C., 0° C. and 30° C.) are used for the calculation of the interaction coefficients for this binary mixture.

The liquid/vapor equilibrium measurements on the HFC-32/HFO-1234yf binary mixture are carried out for the following isotherms: −15° C., 0° C.

The liquid/vapor equilibrium data for the HFC-32/propane binary mixture are available for the following temperatures: 5° C., 22° C., 30° C., 40° C.

The liquid/vapor equilibrium measurements on the HFO-1234yf/propane binary mixture are carried out for the following isotherms: −20° C., −10° C., 55° C.

The liquid/vapor equilibrium data for the HFC-125/HC-290 binary mixture are available for the following temperatures: −15° C., 0° C., 15° C., 30° C., 40° C., 50° C.

For evaluating the energy performances, a compression system equipped with an evaporator and condenser, a compressor and an expansion valve is considered.

The system operates with 5° C. of superheat and 1° C. of subcooling. The saturated vapor evaporation temperature is −35° C. and saturated vapor condensation temperature is 45° C.

The coefficient of performance (COP) is defined as being the useful power supplied by the system over the power provided or consumed by the system.

In the following table, "Temp (° C.)" denotes the temperature, "Temp evap inlet" denotes the temperature of the fluid at the inlet of the evaporator, "Temp comp inlet" denotes the temperature of the fluid at the inlet of the compressor, "Temp comp outlet" denotes the temperature of the fluid at the outlet of the compressor, "Temp exp valve inlet" denotes the temperature of the fluid at the inlet of the expansion valve, "P evap (bar)" denotes the pressure of the fluid in the evaporator, "P cond (bar)" denotes the pressure of the fluid in the condenser, "Glide evap" denotes the temperature glide at the evaporator, "Ratio (w/w)" denotes the compression ratio, "% CAP" denotes the volumetric capacity of the fluid relative to the reference fluid indicated on the first line, "% COP" denotes the percentage of the COP of the fluid relative to the reference fluid indicated on the first line.

Example 2

Results for a Low-Temperature Refrigeration, Comparison With R404a

| R404A | | | | | Temp evap inlet (° C.) | Temp comp outlet (° C.) | Temp exp valve inlet (° C.) | P evap (bar) | P cond (bar) | Glide at evap | Ratio (w/w) | % CAP | % COP |
|---|---|---|---|---|---|---|---|---|---|---|---|---|---|
| HFO-1234yf | HFC-32 | HFC-125 | HC-290 | GWP | | | | | | | | | |
| | | | | 3733 | −35 | 99 | 44 | 1.6 | 20.4 | 0.4 | 12.5 | 100 | 100 |
| 28 | 11 | 60 | 1 | 2131 | −37 | 102 | 40 | 1.5 | 20.1 | 2.2 | 13.4 | 98 | 103 |
| 27 | 11 | 60 | 2 | 2134 | −37 | 102 | 40 | 1.5 | 20.5 | 2.4 | 13.7 | 99 | 102 |
| 26 | 11 | 60 | 3 | 2132 | −38 | 103 | 40 | 1.6 | 20.9 | 2.5 | 13.3 | 100 | 101 |
| 28 | 12 | 60 | 0 | 2138 | −37 | 103 | 41 | 1.5 | 20.3 | 2.1 | 13.5 | 99 | 104 |
| 27 | 12 | 60 | 1 | 2138 | −37 | 103 | 40 | 1.5 | 20.4 | 2.2 | 13.6 | 100 | 103 |
| 26 | 12 | 60 | 2 | 2138 | −37 | 103 | 40 | 1.6 | 20.8 | 2.4 | 13.0 | 101 | 102 |
| 25 | 12 | 60 | 3 | 2139 | −38 | 104 | 40 | 1.6 | 21.2 | 2.5 | 13.3 | 102 | 101 |
| 27 | 13 | 60 | 0 | 2145 | −37 | 104 | 41 | 1.5 | 20.3 | 2.1 | 13.5 | 100 | 105 |
| 26 | 13 | 60 | 1 | 2146 | −37 | 105 | 40 | 1.5 | 20.7 | 2.2 | 13.8 | 102 | 104 |
| 25 | 13 | 60 | 2 | 2146 | −37 | 105 | 40 | 1.6 | 21.1 | 2.4 | 13.2 | 103 | 103 |

Under the conditions of this example, the results show that:
- the compressor outlet temperature is equivalent to the compressor outlet temperature of R404A with the maximum at 105° C.;
- the pressures in the evaporator and the condenser are equivalent to the pressures developed by R404A;
- the temperature glide remains less than 3° C.;
- the volumetric capacity is equivalent to R404A (±3%); and
- the COP is >100% relative to R404A.

According to these results, the same equipment (new or in operation) intended for R404A may be used with the compositions according to the invention.

The results from the table of example 2 show the performances with a saturated vapor evaporation temperature of −35° C. and the saturated vapor condensation temperature of 45° C. (hot climate).

Example 3

This is carried out under the same conditions as example 2, but with a composition containing 25.4% by weight of HFO-1234yf, 12% by weight of HFC-32, 62% by weight of HFC-125 and 0.6% by weight of HC-290, and the following are obtained: a CAP of 699 kJ/m$^3$, a % CAP relative to R404A of 100% and a % COP of 103.

With a composition containing 24.4% by weight of HFO-1234yf, 13% by weight of HFC-32, 62% by weight of HFC-125 and 0.6% by weight of HC-290, and the following are obtained: a CAP of 712 kJ/m$^3$, a % CAP relative to R404A of 102% and a % COP of 104.

The composition containing 24.4% by weight of HFO-1234yf, 13% by weight of HFC-32, 62% by weight of HFC-125 and 0.6% by weight of HC-290 was subjected to a flammability test according to the standard ASHRAE 34-2010. The apparatus used is according to the standard ASTM-E681.

The composition tested and that obtained after leakage—WCFF (Worst Case of Fractionation for Flammability)—having the following composition: 12.93% by weight of HFO-1234yf, 19.75% by weight of HFC-32, 64.65% by weight of HFC-125 and 2.67% by weight of HC-290 are nonflammable.

The invention claimed is:

1. A composition comprising:
   from 11 to 13% by weight of difluoromethane;
   from 59 to 61% by weight of pentafluoroethane;
   from 25 to 28% by weight of tetrafluoropropene and
   from 0 to 7% by weight of propane.

2. The composition as claimed in claim 1, comprising:
   from 0 to 3% by weight of propane.

3. The composition as claimed in claim 1, wherein the tetrafluoropropene is 1,3,3,3-tetrafluoropropene.

4. The composition as claimed in claim 1, wherein the tetrafluoropropene is 2,3,3,3-tetrafluoropropene.

5. The composition as claimed in claim 1, wherein the composition is ternary.

6. The composition as claimed in claim 1, wherein the composition is quaternary.

7. A composition consisting of:
   12% (±0.2%) of difluoromethane;
   60% (±0.2%) of pentafluoroethane; and
   28% (±0.2%) of 2,3,3,3-tetrafluoropropene.

8. A composition consisting of:
   12% (±1%) of difluoromethane;
   62% (±1%) of pentafluoroethane;
   0.6% (±0.2%) of propane and
   24.4% (±1%) of 2,3,3,3-tetrafluoropropene.

9. The composition as claimed in claim 1, comprising:
   from 0.3 to 7% by weight of propane.

10. A heat transfer composition comprising the composition as claimed in claim 1 as heat transfer fluid, and one or more additives selected from lubricants, stabilizers, surfactants, tracers, fluorescent agents, odorous agents, solubilizing agents and mixtures thereof.

11. A heat transfer system comprising a vapor compression circuit containing a composition as claimed in claim 1 as heat transfer fluid, and optionally further comprising one or more additives selected from lubricants, stabilizers, surfactants, tracers, fluorescent agents, odorous agents, solubilizing agents and mixtures thereof.

12. The system as claimed in claim 11, selected from mobile or stationary systems for heating via a heat pump, for air conditioning, for refrigeration and for freezing.

13. A process for heating or cooling a fluid or a body by means of a vapor compression circuit containing a heat transfer fluid, said process successively comprising the evaporation of the heat transfer fluid, the compression of the heat transfer fluid, the condensation of the heat fluid and the expansion of the heat transfer fluid, wherein the heat transfer fluid is a composition as claimed in claim 1.

14. The process as claimed in claim 13, which is a process for cooling a fluid or a body, wherein the temperature of the fluid or of the body cooled is from −40° C. to −10° C.

15. The process as claimed in claim 13, which is a process for cooling a fluid or a body, wherein the temperature of the fluid or of the body cooled is from −15° C. to 15° C.

16. The process as claimed in claim 13, which is a process for heating a fluid or a body, wherein the temperature of the fluid or of the body heated is from 30° C. to 80° C.

17. A process for reducing the environmental impact of a heat transfer system comprising a vapor compression circuit containing an initial heat transfer fluid, said process comprising a step of replacing the initial heat transfer fluid in the vapor compression circuit with a final transfer fluid, the final transfer fluid having a GWP lower than the initial heat transfer fluid, wherein the final heat transfer fluid is a composition as claimed in claim 1.

18. The process as claimed in claim 13, which is a process for cooling a fluid or a body, wherein the temperature of the fluid or of the body cooled is from −35° C. to −25° C.

19. The process as claimed in claim 17, wherein the initial heat transfer fluid is a ternary mixture of 23% of difluoromethane, 25% of pentafluoroethane and 52% of 1,1,1,2-tetrafluoroethane.

20. The composition as claimed in claim 2, comprising from 0 to 2% by weight of propane.

21. The process as claimed in claim 13, wherein the heat transfer fluid comprises:
    from 11 to 13% by weight of difluoromethane;
    from 59 to 61% by weight of pentafluoroethane;
    from 25 to 28% by weight of tetrafluoropropene and
    from 0 to 3% by weight of propane.

22. The process as claimed in claim 21, wherein the heat transfer fluid comprises from 0 to 2% by weight of propane.

23. The process as claimed in claim 13, which is a process for cooling a fluid or a body, wherein the temperature of the fluid or of the body cooled is from −30° C. to −20° C.

* * * * *